Figure 1:
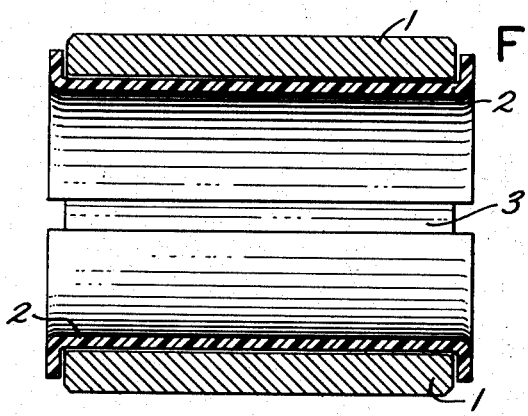

April 13, 1954   J. B. THOMSON   2,675,283
BEARING
Filed Nov. 19, 1949   2 Sheets-Sheet 1

INVENTOR,
John B. Thomson
BY
Emery, Varney, Whittemore & Dix
ATTORNEYS.

April 13, 1954  J. B. THOMSON  2,675,283
BEARING

Filed Nov. 19, 1949  2 Sheets-Sheet 2

INVENTOR,
John B. Thomson,
BY
Emery, Varney, Whittemore & Dix,
ATTORNEYS.

Patented Apr. 13, 1954

2,675,283

UNITED STATES PATENT OFFICE 2,675,283

BEARING

John B. Thomson, Plandome, N. Y.

Application November 19, 1949, Serial No. 128,356

4 Claims. (Cl. 308—238)

This invention relates to improvements in bearings, particularly the sleeve type bushing that may be used for support of rotating or reciprocating members, or combinations of both motions. The object is to provide a bearing that incorporates the low friction, wear resistance, and lubricating properties of certain non-metallic materials without the serious technical difficulties that have prevented the wide application of materials of this type.

Numerous materials, nylon, for example, have excellent wear and bearing characteristics, but one of the difficulties which prevents its use where reasonably close fits are required is the hydroscopic instability of the substance. It will absorb moisture up to 6.5% by weight, which causes severe dimensional changes, ranging up to .025 inch per inch. This limitation obviously precludes use of the material in an ordinary type bearing unless enormous clearances are provided.

Another difficulty which prevents the otherwise desirable material from being used in conventional type bearings is the high coefficient of thermal expansion. It runs as high as $5.7 \times 10^{-5}$, or approximately ten times that of steel. As a temperature rise must accompany friction, the material will expand and, in a conventional type bearing that is confined in a housing, the dimensional increase will cause the bearing to close in and seize on the shaft.

A third difficulty with resinous materials such as nylon relates to the dimensional instability due to internal stresses. The thicker the material cross section, the more acute the problem becomes. Attempts have been made to anneal these materials to stress relieve them, but this is not entirely successful in many instances. It can be appreciated that a bearing is generally unsatisfactory if the bore changes in shape and dimension due to the plastic flow or creep of the material subjected to internal stresses. This factor alone has seriously impeded the application of excellent bearing materials.

Another major difficulty with tough wear resisting plastic materials is the cold flow, or deformation under load that characterizes many of them. This prevents a bearing or bushing of this type from being retained in a housing by a press fit. The external force of a press fit will cause the material to gradually flow away from the force, causing a reduction in the bore diameter, a seizure on the shaft, and a loosening of the bearing in the housing. Heretofore it has been necessary to design and employ other means to retain plastic type bearings. This is a very distinct disadvantage both from a design and cost standpoint.

A further deterrent to the use of plastic bearings has been the high cost. Nylon rods, for example, from which bearings are machined, cost four or five dollars a pound, somewhat depending one the size and quantity. Obviously, to bore out a hole, and then scrapping the material from the hole, makes a bearing of this type exceedingly expensive. Heretofore, the only alternative was to make the bearings by injection moulding, with the hole moulded into the bearing. This procedure can only be justified if the quantities to be produced are tremendous, as multiple cavity injection moulds cost thousands of dollars each. Even in cases where the cost of a mould can be justified, there is a certain amount of loss due to the necessity for salvaging the material that remains in the sprues and runners of the mould.

In accordance with my invention, I provide a composite bearing structure having features which entirely eliminate, or greatly minimize, all of the aforementioned limitations and difficulties. Thus the present invention provides a bearing which is capable of being used as a precision bearing with close fits on its cooperating shaft. In general, a bearing of my present invention comprises a main sleeve member or housing preferably of metal and having a sufficiently heavy wall to support the bearing as a whole, and a secondary sleeve member of a non-metallic material (such as nylon, for example) which is fitted to and co-axial with said supporting sleeve or housing and which, having regard to the relatively high cost of such material and other considerations, may, if desired, have a relatively thin wall. Moreover, the secondary sleeve member is movable in a circumferential direction relative to the supporting sleeve or housing but is restrained from movement relative thereto in an axial direction, and is split from end to end to form a gap of sufficient width to permit it to expand freely in a circumferential direction, under operating conditions, without cramping. And while the secondary sleeve member may be made from various non-metallic materials, I prefer to make it from such plastics as are more highly resistant to wear and have a lower coefficient of friction than the metal from which the main sleeve member or housing is made.

Figure 2:
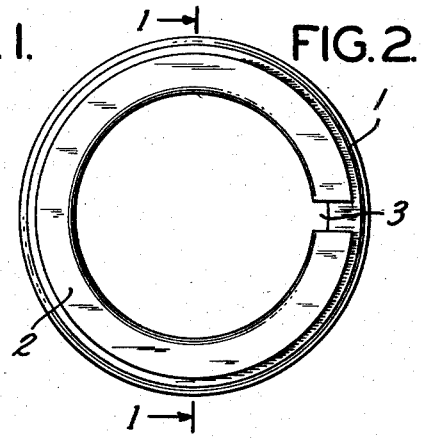

Of the many forms in which my invention may be embodied, that shown in Figs. 1 and 2 is typical, Fig. 1 being a longitudinal section through this bearing and Fig. 2 an end view thereof. In the bearing shown in those two figures, the supporting member or housing consists of an outer sleeve 1, and the secondary member consists of the inner sleeve 2 fitted to the sleeve 1 but movable circumferentially within the same, and restricted from axial movement relative to the outer sleeve by the outwardly projecting flanges shown at the ends of this bearing. The longitudinally extending gap in the inner sleeve is denoted by the numeral 3; and this gap should be of sufficient width to prevent the edges of the gap from having pressure contact with each other when the inner sleeve expands in use.

Figure 3:
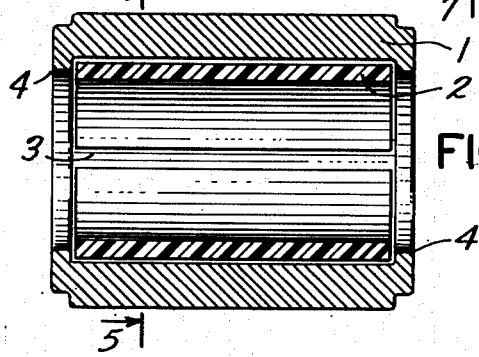
Figure 4:
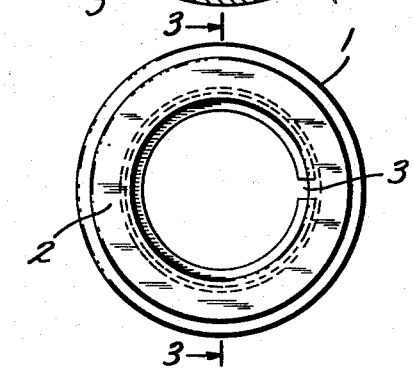
Figure 5:
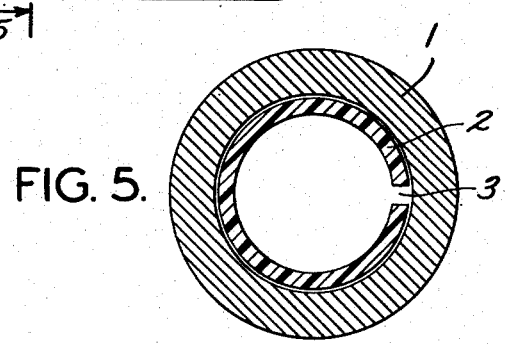

Certain other embodiments of my invention which are shown in the accompanying drawings may be briefly referred to. For example, Fig. 3 shows the same basic elements, but a different means of longitudinal retention is used. Here the liner or sleeve 2, is retained by an inturned lip 4, which may be formed in the outer sleeve 2 by swaging or other suitable means. Fig. 4 is an end view of Fig. 3 in which the liner or sleeve with its longitudinal slot or compensation gap 3 can be seen in place. Fig. 5 is a cross-section taken at 5—5 of Fig. 3.

Figure 6:
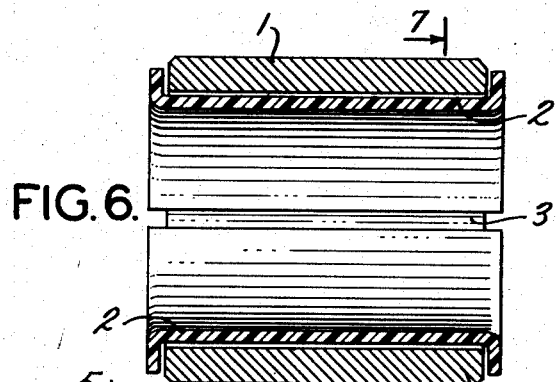
Figure 7:
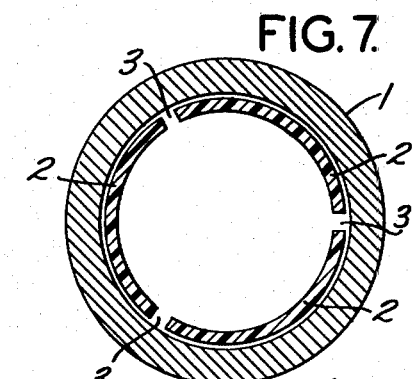

Fig. 6 is a section through the bearing similar to Fig. 1 with the exception that the inner bearing sleeve is provided with three compensation gaps, as can be more clearly seen in Fig. 7, which is a section through 7—7 of Fig. 6.

Figure 8:
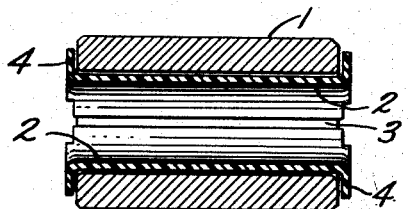
Figure 9:
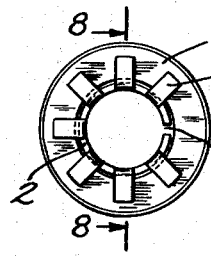
Figure 10:
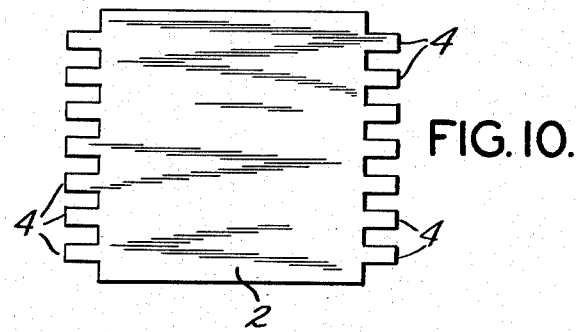

Fig. 8 is a variation of the general construction shown in Fig. 1. Fig. 9 is an end view of this bearing showing how the inner bearing sleeve is retained by outwardly turned tabs which are cut into the inner sleeve bearing material prior to rolling it up to form the sleeve member. Fig. 10 shows a plan view of how this part would look in the flat.

Figure 11:
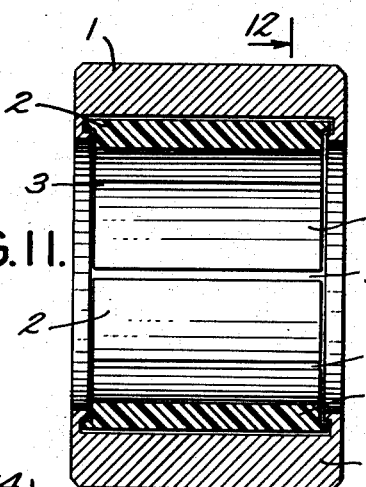
Figure 12:
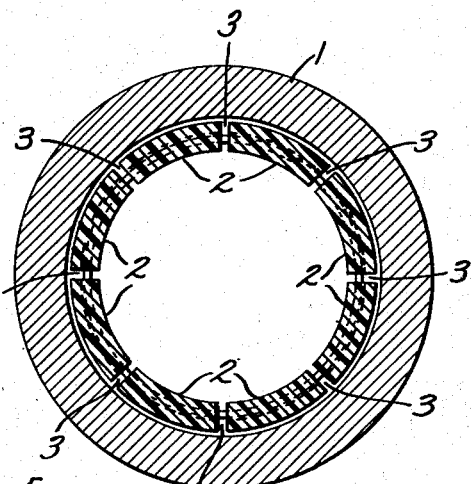

Fig. 11 shows another construction employing the same basic principle and having, in this case, eight compensation gaps in the inner bearing sleeve member. These can be clearly seen in Fig. 12, which is a cross-section at 12—12 in Fig. 11. The individual segments which comprise the inner bearing sleeve member are held in structural relationship by the inturned lips engaging the flange on the bearing material as shown in Fig. 11.

Figure 13:
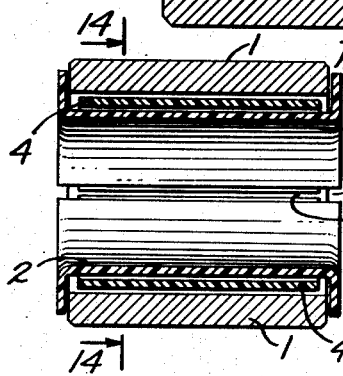
Figure 14:
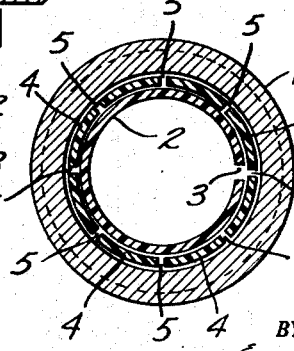

Fig. 13 is a longitudinal section through another variation of a bearing employing the same basic principle, but with the exception that there are two inner bearing sleeve members, both free to float circumferentially, and provided with one or more compensation gaps. As can be seen in Fig. 14, which is a section through 14—14 of Fig. 13, the inner bearing sleeve 2 has one compensation gap 3 which gives it the required structural rigidity, while the outer bearing sleeve 4 has a plurality of compensation gaps, as shown at 5.

It will be noted that the constructions shown in Figs. 1, 2, 6, 8, 9, and 13 form suitable bearings for thrust loads in an axial or linear direction, as well as loads perpendicular to the axis of the bore. This is possible as the outturned flare is bearing material, and therefore suitable for carrying a load against the flat end face of the outer member.

Another important feature of this construction principle is the fact that relative rotation can occur between a shaft within the bearing and the inside surface of the inner bearing sleeve or between the outer surface of the inner bearing sleeve and the inner surface of the outer member. It will, therefore, turn at the point of least resistance, which is the ideal bearing condition. In some applications, relative rotation can be made to occur in both places at approximately the same rate. This doubles the bearing surface and halves the rotational rate. The advantage and distinctiveness of this feature will be obvious to those skilled in the art.

The arrangement of the principle illustrated in Figs. 13 and 14 carries this advantage even farther, and, in addition, affords even less friction by virtue of the fact that there is a lower coefficient of friction between two bearing materials such as nylon on nylon than will be found with nylon on metal. In addition to greatly increasing the bearing surface and reducing the relative rotational rate, the principle of the floating bearing sleeve greatly extends the life of the bearing by virtue of the fact that as it rotates within the outer member, it is constantly presenting a new surface to the point of load contact. In conventional bearings, the wear is concentrated over a small segment of the periphery, since the load is usually primarily in one direction. It can be appreciated that in Fig. 14 the outer bearing sleeve member 4 could be continuous and provided with as few as one compensation gap, similar to the inner bearing sleeve member 2.

The constructional features which combine to afford the solution to the problems of previous plastic type bearings are as follows. The secondary sleeve members of non-metallic bearing material are relatively thin in cross-section; they are also provided with one or more compensation gaps and are free to both rotate and expand or contract circumferentially.

The problem of hydroscopic instability is solved as any dimensional change due to variations in moisture absorption is negligible, since this change is a function of the amount of material involved. The relatively thin cross section of the secondary bearing sleeve could change substantially in terms of a percentage of its thickness without an appreciable diameter variation. In addition, the strip material from which this component of the bearing is made has a large surface area in relation to its mass which enables it to quickly absorb much of its moisture capacity and therefore it becomes stabilized and subject to lesser variations due to changes in ambient humidity.

Hydroscopic instability will affect the secondary bearing sleeve member by varying its circumferential dimension, since this dimension is relatively large. This difficulty is overcome by inclusion of the compensation gap, or gaps, and the fact that the construction allows the bearing sleeve member to float or travel around the inner periphery of the outer sleeve to find its point of equilibrium.

The problem of high thermal expansion, which heretofore has plagued plastic bearings is also eliminated by the same features which were combined to solve the troubles due to hydroscopic dimensional variations. It can be seen that the bearing sleeve member can undergo considerable expansion and contraction along its peripheral dimension without altering the effective diameter of the working bore. Here again, changes in temperature due to operational variations may cause the thickness of the secondary bearing sleeve to change in the same percentage as the circumference, but due to the relatively thin cross section, the actual dimensional variation is very small.

Difficulties due to internal stress deformation of conventional plastic material bearings are eliminated as the design permits the use of the thin section secondary sleeve bearing member. Residual stresses are found to be greater as the mass increases, since they result largely from unequal cooling of the material after moulding. The thin sheet material from which the bearing sleeve is made will cool uniformly, thus minimizing the distortion that internal stresses will cause in materials subject to creep or cold flow. The effect of whatever small stresses remain in the thin bearing sleeve will be neutralized by the combination of the compensation gap and the free floating bearing sleeve features of the invention.

The construction arrangement makes the bearing immune to creep or cold flow as a result of external forces such as those accompanying a press fit. The bearing is ideal for press fitting, since the outer metal supporting sleeve will withstand severe compressive hoop forces without transmitting them to the plastic bearing material of the inner non-metal secondary sleeve. While it is obvious that the bearing can be installed in many other ways, press fitting is generally considered the most economical and satisfactory type of mounting. The ability to do this is an outstanding advantage over plastic bearings that have been made in the past.

The construction shown in this invention permits the manufacture of a bearing that is not only far superior, but much less costly than plastic bearings which are now being used throughout the industry in considerable quantity. Actually, the bearing's unique construction enables it to be produced for less than a simple, plain bronze bushing, a by far inferior bearing in most applications. For example, the outer metal supporting sleeve can be produced from inexpensive low carbon steel tubing by a simple cut-off operation on automatic screw machines. The material cost is sufficiently less than bronze to more than make up for the fact that a small amount of relatively high priced non-metallic bearing material is involved. In this bearing, relatively little of the expensive material is used, and there need not be any more than is necessary for structural stability of the secondary bearing sleeve member plus an allowance for wear based on permissible play in the application. None of the non-metallic bearing material is machined away or lost in sprues and runners.

In addition to using very little of the plastic bearing material, and wasting none of it, the construction enables the use of the least expensive form of solid plastic material. For example, nylon, an excellent bearing material from the standpoint of toughness and friction characteristics, can be procured in strip form for approximately three dollars a pound, as compared to four or five dollars for cast nylon rod from which many bushings are now being machined.

Another important feature of the construction lies in the fact that the bearings can be made in large or very small quantities economically and quickly without expensive tooling or capital investment. The only previous method of making small lots of plastic bearings was to machine them from solid bar, which is almost prohibitive in cost, and the finished product has all the disadvantages previously outlined. In extremely small or sample quantities, bearings of the construction disclosed can simply and quickly be made by turning the outer main or supporting sleeve member on an engine lathe and cutting a strip of plastic material to the proper width and length with scissors or a shear for the secondary inner bearing sleeve which can quickly be assembled by rolling it up and inserting it in the bore of the main sleeve. With a simple tool containing a heating element, the protruding ends can be flared out to hold the components together and provide a bearing material surface at the ends for thrust loads. In medium quantities, the main sleeves are of suitable design to be economically produced on a turret lathe or hand screw machine. At this level of production, the plastic bearing sleeve could be blanked out in the flat with simple inexpensive and flexible steel rule dies in a punch press. For large production, the main sleeves are suitable for high speed production on multi-spindle automatic screw machines, or they could be formed by rolling them up from a flat strip of metal with the ends abutting. For this type production the secondary bearing sleeve could be blanked out in high speed automatic feed dies. It is also possible to extrude a strip of plastic having a cross section as shown at 2 in Fig. 1. This material could be cut-off, rolled up, and inserted into the sleeve by collapsing it sufficiently to enter the bore of the outer sleeve and allowing it to snap back into place after the two parts are in their proper longitudinal relationship.

Still another important advantage gained by the construction is the ability to control the point of wear and locate it away from expensive parts. This is done by governing the surface condition of the shaft that fits within the inner bearing sleeve and the inner surface of the outer sleeve member. In an electric motor, for example, the shaft and armature are frequently integral. Because of the cost of this assembly, it would be more desirable to have an inexpensive replaceable bearing to take the wear rather than the costly armature shaft. To accomplish this, the shaft ends where they engage the bearings should be provided with a roughened surface such as a fine knurl. If the inner surface of the outer sleeve has a smooth polished surface, all of the rotation will take place between that surface and the outer surface of the bearing sleeve. In this manner, the armature shaft does not wear, and the inexpensive replaceable bearing can be changed when necessary. It will readily be seen that rotational control and the location of wear can be done in any number of combinations of surface conditions.

Another feature of this construction is the relatively low operating temperature that is achieved due to efficient thermal dissipation. This is important in plastic type bearings, since most of the more efficient bearing materials in this category should not operate at temperatures above 250° F. because of their low melting points. In any friction bearing, the operating temperature is determined by a balance which is reached between the heat generated due to friction and the heat dissipation from the assembly. The coefficient of thermal conductivity of most good plastic bearing materials is low, and consequently their insulating properties tend to store heat rather than conduct it away from the point of generation. The extent to which this occurs is a function of the thickness of the material and its relation to adjacent materials having better conductivity properties. It will be noted that in the invention disclosed, the combination of the relatively thin secondary bearing sleeve member in direct contact with a relatively thick main sleeve of highly conductive material, which, when installed would be in pressure contact with another mass of conductive material, affords the lowest possible heat storage, and the maximum rate of dissipation. This feature, in combination with the mechanical operating features previously described, makes this bearing far superior to the plastic type bearings heretofore produced.

It will be understood that no attempt has been made to illustrate all possible forms of the principle described, and that numerous variations can be made without departing from the spirit of the invention.

I claim as my invention:

1. A bearing adapted to have a shaft mounted therein comprising an outer housing, and an inner liner of nylon fitted to and circumferentially movable within said housing, means restraining the liner from axial movement, said liner being adapted for precision fitting to said shaft and being very thin in relation to its circumference and provided with a longitudinal slot extending from end to end and of a width at least as great as the circumferential expansion of the nylon liner under operating conditions.

2. The bearing as claimed in claim 1 in which the means for restraining the inner liner from axial movement comprises a radially outwardly extending portion of the liner.

3. The bearing as claimed in claim 1 in which the means for restraining the inner liner from axial movement comprises a radially inwardly extending portion of the housing.

4. A bearing adapted to have a shaft mounted therein comprising an outer housing, and an inner lining of nylon fitted to and circumferentially movable within said housing, means restraining the liner from axial movement, said liner being adapted to be closely fitted to the shaft and being very thin in relation to the circumference of the liner and said liner being provided with slotted portions extending from end to end for circumferential expansion at all points across the axial length of the liner, the slotted portions providing a gap at least as great as the circumferential expansion of the nylon liner under operating conditions.

References Cited in the file of this patent

UNITED STATES PATENTS

| Number | Name | Date |
|---|---|---|
| 15,817 | Riley | Sept. 30, 1856 |
| 240,640 | Barnes | Apr. 26, 1881 |
| 444,812 | Carey | Jan. 20, 1891 |
| 1,562,644 | Jones | Nov. 24, 1925 |
| 2,106,860 | Tibbetts | Feb. 1, 1938 |
| 2,246,086 | Austin | June 17, 1941 |

FOREIGN PATENTS

| Number | Country | Date |
|---|---|---|
| 18,736 | Great Britain | 1902 |
| 24,495 | Great Britain | 1908 |